US009266756B2

(12) United States Patent
Swantner et al.

(10) Patent No.: US 9,266,756 B2
(45) Date of Patent: Feb. 23, 2016

(54) MOBILE BORATION SYSTEM

(71) Applicant: Westinghouse Electric Company LLC, Cranberry Township, PA (US)

(72) Inventors: Stephen R. Swantner, Pittsburgh, PA (US); Ryan T. Vanston, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 369 days.

(21) Appl. No.: 13/792,465

(22) Filed: Mar. 11, 2013

(65) Prior Publication Data
US 2014/0069515 A1 Mar. 13, 2014

Related U.S. Application Data

(60) Provisional application No. 61/635,315, filed on Apr. 19, 2012.

(51) Int. Cl.
*G21C 9/033* (2006.01)
*G21C 15/18* (2006.01)
*C02F 1/68* (2006.01)
*G21D 1/02* (2006.01)
*G21D 3/04* (2006.01)

(52) U.S. Cl.
CPC ............... *C02F 1/687* (2013.01); *G21C 9/033* (2013.01); *G21C 15/182* (2013.01); *G21D 1/02* (2013.01); *G21D 3/04* (2013.01); *Y02E 30/40* (2013.01); *Y10T 137/2496* (2015.04)

(58) Field of Classification Search
CPC ......... G21C 9/033; G21C 15/182; G21D 3/04
USPC ................................ 376/282, 909; 137/87.01
See application file for complete search history.

(56) References Cited

U.S. PATENT DOCUMENTS

| 4,225,390 | A | * | 9/1980 | Brown et al. ................. 376/328 |
| 4,595,555 | A | * | 6/1986 | Orii .............................. 376/282 |
| 4,609,523 | A | | 9/1986 | Gerlowski |
| 4,726,715 | A | | 2/1988 | Steen et al. |
| 4,764,337 | A | | 8/1988 | Panson |
| 5,171,515 | A | | 12/1992 | Panson et al. |
| 5,894,134 | A | | 4/1999 | Kissenger |
| 8,233,581 | B2 | | 7/2012 | Connor et al. |

(Continued)

OTHER PUBLICATIONS

Hodge et al. "Identification and Assessment of BWR In-Vessel Severe Accident Mitigation Strategies". Oak Ridge National Laboratory. Oct. 1992. Retrieved from the Internet. <URL: http://web.ornl.gov/info/reports/1992/3445603689514.pdf> entire document.

(Continued)

*Primary Examiner* — Jack W Keith
*Assistant Examiner* — Daniel Wasil
(74) *Attorney, Agent, or Firm* — Richard J. Coldren; Westinghouse Electric Company LLC

(57) ABSTRACT

A mobile boration system (60) has a number of components that are mobile and include a water source (10), $H_2BO_3$ powder supply (14), a mixer to mix the solution (20) capable of providing a boric acid solution (30) with minimal air entrainment and optional heat exchanger(s) (12), and wherein the system (60) is capable of transport to a nuclear power plant facility by land, sea or air, rather than being in place in a large vulnerable footprint.

9 Claims, 2 Drawing Sheets

(56) References Cited

U.S. PATENT DOCUMENTS

| | | | |
|---|---|---|---|
| 2010/0239062 A1* | 9/2010 | Yeon et al. | 376/282 |
| 2010/0272226 A1* | 10/2010 | Kojima et al. | 376/282 |
| 2013/0121454 A1* | 5/2013 | Newton et al. | 376/299 |
| 2013/0170599 A1* | 7/2013 | Muller et al. | 376/282 |

OTHER PUBLICATIONS

Green. "The Radiological and Environmental Impact of Nuclear Accidents—a Case Study of Japan's Fukushima Daiichi Nuclear Power Plant". University of Surrey. Sep. 2011. Retrieved from the Internet. <URL:http://personal.ph.surrey.ac.uk/-phs 1 pr/msc_dissertations/msc-diss-2011/Hannah-Green-Dissertation-fukushima.pdf> entire document.

Brown et al. "Slurry and Air Do Mix: Interim Results of WFGD Absorber Slurry Aeration Studies". Babcock & Wilcox Power Generation Group. 2008. Retrieved from the Internet. <URL:http://www.babcok.com/library/pdf/BR-1816.pdf>. entire document.

International Preliminary Report on Patentability for PCT/US2013/036852 dated Oct. 30, 2014 (Forms PCT/IB/326, PCT/IB/373, PCT/ISA/237).

* cited by examiner

MOBILE BORATION SYSTEM

CROSS REFERENCE TO RELATED APPLICATION

This non-provisional patent application is based on and herein claims priority under 35 U.S.C. §119(e) from its Provisional Application Ser. No. 61/635,315, filed Apr. 19, 2012, entitled "Mobile Boration System," by the same inventors.

BACKGROUND

1. Field

This invention relates to supplying borated water to commercial nuclear power plants.

2. Description of Related Art

Commercial nuclear power plant operators are exploring solutions to eliminate and/or mitigate damages caused by natural and/or man-made disasters, such as the tsunami that recently damaged the Fukishima nuclear power plant in Japan, including not only the reactors but many other supply systems permanently built on site, with substantial footprint. One system that is being examined is the water supply system. The boration of supply water is usually considered necessary to provide a neutron poison liquid to help maintain the reactor as subcritical.

Useful boric acid solutions in nuclear reactors is taught early on, for example, by Panson in U.S. Pat. No. 4,764,337, which states that:

the use of boric acid for preventing or at least inhibiting carbon steel corrosion in the secondary water systems of nuclear steam generators has been known for some time. In particular, boric acid has been utilized to minimize the phenomena known as denting at the tube/-tube support plate interface in nuclear steam generators. While boric acid alone has been found to be highly useful for inhibiting carbon steel corrosion of the type which results in denting, nuclear applications require a continuous search for improved systems and increased reliabilities. Diol boric acid compounds which are more strongly acidic than boric acid alone are known . . . .

There appears to be a reaction between boric acid and diol compounds to activate boric acid by producing diol boric acid complexes which have more acidic characteristics than does boric acid itself. However there is no suggestion . . . that such diol boric acid complexes are capable of inhibiting corrosion. And even more so there is no disclosure that diol boric acid complexes might be useful for inhibiting carbon steel corrosion in nuclear steam generator applications.

Importantly, it was later found that boric acid can be used as a moderator to suppress some neutron flux, as taught by U.S. Pat. Nos. 8,233,581 and 5,171,515 (Connor et al. and Panson et al., respectively). In another area, Brown et al., in U.S. Pat. No. 4,225,390 shows the level of complexity for boron control systems for nuclear power plants.

Boration supply systems currently in operation utilize a completely on-site, permanent batching tank of substantial size, requiring major auxiliaries to keep it "on site useful," to blend the desired concentration of boric acid and water to provide an appropriate solution prior to injection into the coolant water used within the reactor coolant system of a nuclear reactor.

The major disadvantage of current boration supply systems is that they require a very large permanent batching tank with attached components including a permanent motorized agitator and a heating system for mixing and maintaining relatively high concentrations of boric acid in solution. As such, current boration supply systems are a problem in that they require a large amount of space, that is, a large footprint, and a major amount of power. These requirements do not conceive of current boration supply systems to be transportable or mobile, and are permanently on site. Thus, there is a need to mimic nuclear power plant boration systems with a system that provides a smaller in-place footprint, is easily transportable, and make more efficient use of energy and resources during events when the installed plant equipment is not operable or is not desirable for use.

SUMMARY

The above problems are solved and needs supplied by providing a mobile boration apparatus providing nuclear reactor systems with borated coolant that can mix components on site, to provide borated water, the mobile apparatus comprising a) a mobile transportation means containing b) a water source, c) a $H_2BO_3$ powder or other water soluble boron source, d) a heater to heat the water, e) a pump to provide a motive force to move water to a desired location, f) a mixer to allow metered mixing of the water and $H_2BO_3$ powder or other water soluble boron source to provide a metered appropriate concentration of initial water/boric acid slurry that is desired, which slurry during continued mixing provides a borated/boric acid water solution, g) an optional heater, h) a fluid exit for boric acid solution, and i) transporting the solution to a nuclear reactor system, eliminating major storage of the solution.

A continuous flow of transport apparatus by road, rail or sea can provide complete supply and auxiliary safe supply without building a massive series of structures next to the nuclear facility which would be subject to a wide variety of catastrophic events.

BRIEF DESCRIPTION OF THE DRAWINGS

In order to better understand the invention more clearly, convenient embodiments will now be described, by way of example with reference to the accompanying drawings in which.

DESCRIPTION OF THE PREFERRED EMBODIMENT

The boration supply system according to the present invention overcomes the limitation of current systems and provides a solution for eliminating and/or mitigating damages to a commercial nuclear power plant. According to one embodiment of the present invention, a mobile boration supply system is provided capable, for example, to refill the refueling water storage tank. This system must be easily stored and transportable. Because of its mobility by sea, land or air transport, the boration supply system of the present invention is capable of being centrally deployed and transportable to any nearby site that may require boration. This is a vast improvement over the design characteristics of prior art boration supply systems employed to batch boric acid in power plants. The boration supply system of the present invention is designed to use a minimum number of required pieces of equipment, one or more of which are selected for minimal size and power consumption requirements. As such, the system is ideal for mobile applications via truck, train or sea. The relative small size of the system also makes it suitable to other possible permanent applications.

Figure 1:
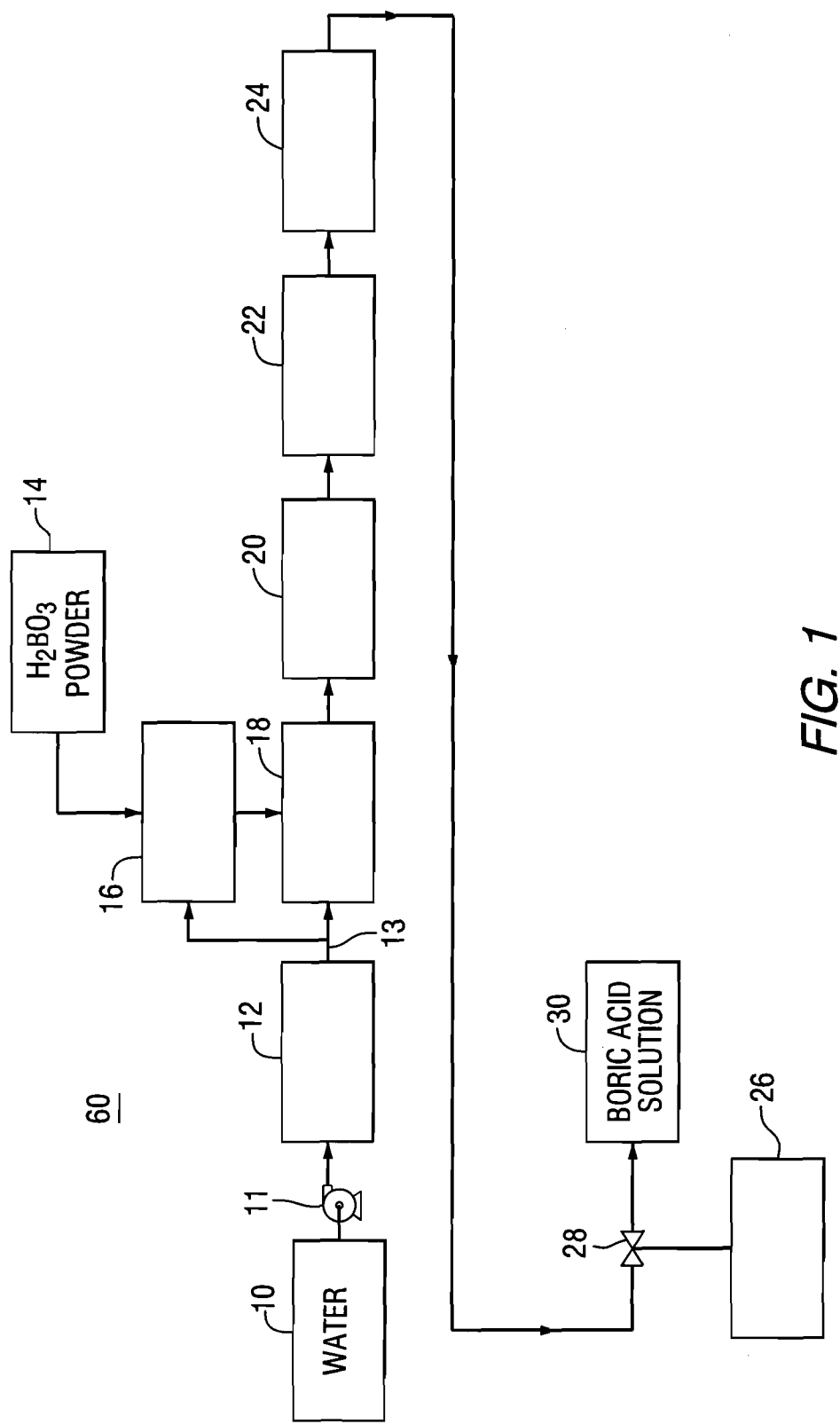
FIG. 1 shows one embodiment of the flow of the components on the transportation means.

FIG. 1 illustrates a boration supply system 60 according to one embodiment of the present invention. As seen in FIG. 1, the system includes: a water pump, such as a positive displacement pump or centrifugal pump, with a flow control device to provide a metered source of fluid; a slurry funnel and eductor system with a screw feed hopper to directly handle powered boric acid and eliminate the need for large batching tanks; and a mechanical mixing device to allow sufficient time and provide sufficient mechanical agitation to ensure boric acid goes into solution. In the current embodiment, the mechanical mixing device reduces the possibility of entraining air, less than 1 vol. %, in the downstream flow, which would be undesirable. The mechanical mixing device can incorporate an optional upstream orifice/valve to tune the flow distribution. A metering screw takes the $H_2BO_3$ powder, or other source of boron that is water soluble, from the hopper and can provide a controlled volume flow with a relatively high accuracy (0.5%). The mixing device may also incorporate a "screw speed to ppm" correlation if possible. In the current embodiment, the mass flow rate of the $H_2BO_3$ powder is about 23 lb/min.

In other embodiments, the boration supply system of the present invention can incorporate an optional heater and chemical additive tank to provide the required solvent temperature and chemistry to facilitate driving boric acid into solution.

As shown in FIG. 1 (and FIG. 2), an optional water source 10 (32), which may be outside the boundary of the device if a local water source is available, is pumped, by optional pump 11 (34), into a heat exchanger 12 (41). The heated water 13 (45) is passed to a wash-down funnel 16 or the like 42 and metered with feed granular $H_2BO_3$ powder 14(36) to provide an aqueous $H_2BO_3$ slurry. Pump 11 may not be needed. There may be a pump near a water source, municipal water supply, river, lake, etc. This slurry is fed into an eductor 18 which sucks the slurry, plus additional heated water 13 which is mixed to provide a homogeneous slurry and further heated in mixing device 20 (44). Boron concentration is checked on detector 22 to provide a desired boron concentration solution. Flow element 24 meters flow rate of the solution. Some sludge slurry can be passed to collector 26 (36') via valve 28 and finally to optional hold-up feed tank 30 (50) for the reactor. It may be pumped directly into the nuclear system.

Figure 2:
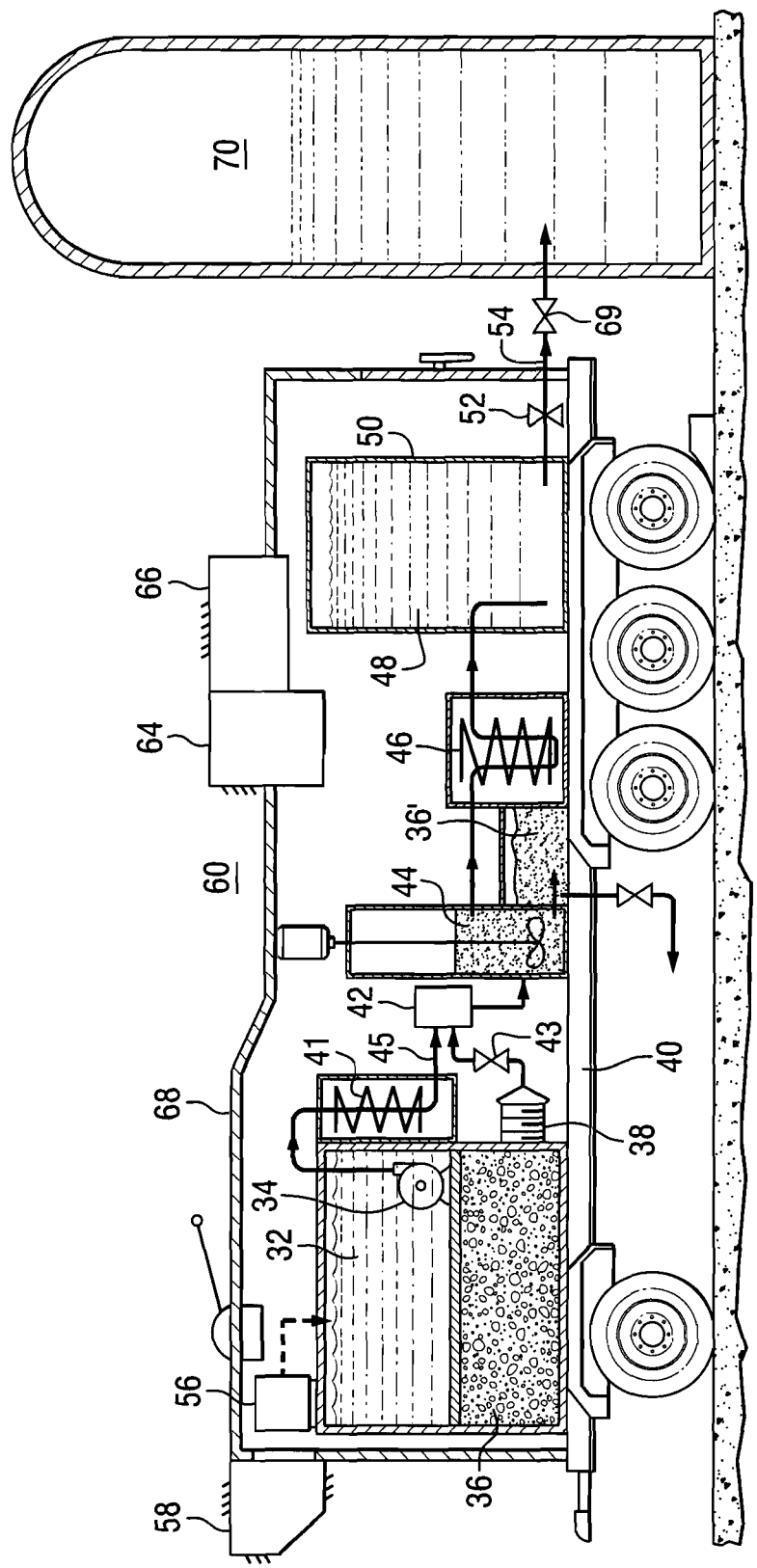
FIG. 2 illustrates one possible mobile flat bed truck transporter carrying the appropriate equipment components set out in FIG. 1, to provide a mobile boric acid solution platform which can be driven directly in to the nuclear complex for delivery of the boric acid solution to one of a plurality of optional stationary water tanks, the combination of which provides a minor footprint on the nuclear plant area.

FIG. 2, based completely on FIG. 1, shows a possible delivery platform such as a truck flatbed, or other transportation means 40, or such as a railroad car. The transport 40 can contain a hold-up water tank 32, granular powder tank/supply 36, screw powder feed 38, water pump 34, water heater 41, water metering system 42, valve 43, mixer 44, waste water slurry tank 36', high aqueous slurry heater 46, to provide boric acid solution 48 fed into optional storage tank 50 and through valve 52 to boric acid feed 54 through valve 69. This feed 54 flows into optional minimal storage tank 70. Optional additive tank is shown as 56. Also shown are optional heater/air conditioner 58, power control function system 66 and additional monitors 64 as well as truck cover structure 68.

The versatility of this supply means, while requiring a semi-constant supply of transported borated water is not only vastly safer but financially more sound than vulnerable on-site storage.

While the invention has been described in terms of preferred embodiment, various changes, additions and modifications may be made without departing from the steps of the invention. Having described the presently preferred embodiments, it is to be understood that the invention may be otherwise embodied within the scope of the appended claims.

What is claimed is:

1. A mobile boration system configured to provide nuclear reactor systems with borated coolant that can mix components of the borated coolant on site, to provide borated water, the mobile boration system comprising:
   a) a water source or a connection to an external water source;
   b) a water soluble boron powder source;
   c) a heater to heat the water;
   d) a pump operable to provide a motive source to move water to a desired location;
   e) a metering system configured to meter flow of the boron powder source and water heated by the heater;
   f) a mixer configured to allow metered mixing of the heated water and the water soluble boron source to provide a metered concentration of water/boric acid slurry;
   g) a further heater configured to heat the slurry, wherein mixing of the slurry by the mixer and heating of the slurry by the further heater provides a borated/boric acid water solution;
   h) a fluid exit for the solution; and
   i) a transport arrangement configured to transport the solution to a nuclear reactor system, wherein the transport arrangement eliminates the need for onsite storage of conventionally large volumes of borated/boric acid water solutions.

2. The mobile boration system of claim 1, wherein the pump of (e) is selected from the group consisting of a positive displacement pump and a centrifugal pump with a flow meter.

3. The mobile boration system of claim 1 wherein the water soluble boron powder source is $H_2BO_3$ powder and the metering system is a screw feed hopper.

4. The mobile boration system of claim 1, wherein the mixer is a mechanical mixer which can provide sufficient agitation to ensure the slurry is dissolved into the solution with an air entrainment in the solution of less than 1 vol. %.

5. The mobile boration system of claim 3, wherein the screw feed of the hopper can provide a controlled volume flow of $H_3BO_3$ powder.

6. The mobile boration system of claim 1, wherein the transport arrangement is selected from a truck trailer, a railroad flatbed, sea transport or air transport.

7. The mobile boration system of claim 1, further comprising a chemical additive tank housing an additive, said additive helping the slurry dissolve into the solution.

8. The mobile boration system of claim 1, wherein the water source is a tank of water on the transport arrangement.

9. The mobile boration system of claim 1, wherein the water soluble boron powder source comprises a $H_2BO_3$ powder source.

* * * * *